Dec. 8, 1953 J. F. KLINKHAMER 2,662,216

ELECTRIC FILTER NETWORK

Filed May 16, 1950 2 Sheets-Sheet 1

INVENTOR.
JACOB FREDRIK KLINKHAMER
BY [signature]
AGENT

INVENTOR
JACOB FREDRIK KLINKHAMER
BY Fred M Vogel
AGENT

Patented Dec. 8, 1953

2,662,216

UNITED STATES PATENT OFFICE 2,662,216

ELECTRIC FILTER NETWORK

Jacob Fredrik Klinkhamer, Eindhoven, Netherlands, assignor to Hartford National Bank and Trust Company, Hartford, Conn., as trustee Application May 16, 1950, Serial No. 162,296

Claims priority, application Netherlands June 1, 1949

5 Claims. (Cl. 333—70)

The present invention relates to ladder networks and more particularly to ladder networks comprising at least two sections and having a straight transmission characteristic curve which drops abruptly towards zero outside the transmission band of the network. The term "section" is to be understood to mean the parts of which the network is built up and each of which comprises an impedance in the series circuit followed by an impedance in the parallel circuit of the network. The term "section impedance" is to be understood to mean the series or the parallel impedance respectively of said section.

The principal object of the present invention is to provide a ladder network with improved transmission characteristic.

Another object of the invention is to provide a ladder network wherein the use of substantially pure reactance elements is not necessary to achieve good characteristics.

Further objects of the invention will appear from the following description.

Network theorists have devised a network synthesis which permits to calculate the value of the section impedances of such a network, for example a band-pass filter network. For this purpose the desired transmission characteristic curve is written in an algebraic form of a broken, rational polynomial in the complex frequency $\lambda$, the roots of the numerator of this polynomial corresponding to the zero points and those of the denominator corresponding to the poles of the transmission characteristic curve of the network. If the network is constituted by loss-free reactances, the zero points are all purely imaginary. The values of the reactances may then be directly determined according to any of the known syntheses. In general, the calculation is carried on on the assumption that the energy absorption, which is caused by the loss components of the network reactance elements is negligible relative to that of an input and/or output resistance. In order that this assumption may be permissible and the network not absorb an excessive amount of energy, the reactances should have low losses.

The manufacture of reactances sufficiently free from losses is, however, comparatively costly so that there will always be a tendency to build up the network from reactances which are not free from losses. For determining the values of these reactances the network synthesis hitherto employed did not provide a general solution.

The invention is based on the recognition that, in constructing a network to have a desired transmission characteristic, only a slight error is made in the achieved transmission characteristic curve if all the zero points of this network are increased by the same damping factor $-H_0$. Such a network may be calculated with the use of the same known network synthesis. For this purpose the values of the reactances of a network, which are provisionally assumed to be loss-free, are determined to have the same imaginary zero points $O_1$ as the basic network but having poles $P_1$ all reduced by a constant real value $-H_0$. Then the complex frequency $\lambda=H+j\omega$ is transformed into a complex frequency $\lambda'=\lambda+H_0$, so that all the poles and zero points are increased by the same real value $-H_0$. The physical significance of this is that, loss resistances having a value $H_0L$ and $$\frac{1}{H_0C}$$

are introduced in series with the inductances L and in parallel with the condensers C respectively. It is now found that the transmission characteristic curve of such a network substantially coincides with that of the basic network, except that, in the neighbourhood of the limiting or cut-off frequencies, the transmission characteristic curve exhibits irregularities; it appears namely that, at these frequencies, the transmission is higher or the attenuation, i. e. the negative logarithm of the transmission is lower than it should be both within and without the transmission band. The invention is intended to provide a network comprising reactances which are not free from losses, but in which these irregularities are avoided.

The invention is characterized in that the poles and zero points of the desired network, which is constituted by reactances having loss components and an input and/or an output resistance, correspond to that of a network consisting of loss-free reactances, and an input and/or an output resistance so that the network has substantially the same transmission characteristic curve as a network comprising loss free reactance elements; the zero points of the desired network, compared to those of the basic network, are increased by the same real amount $-H_0$, and in the network thus obtained, that section which is associated with at least one of the two zero points of this network outside of but the most adjacent to the transmission band, is replaced by a section having the same impedance but which does not pass the frequencies in the proximity of the zero point.

For the section to be made free from losses a final section of the network will preferably be chosen, in which event only the input impedance of the substitute section need be equal to that of the initial section.

In order that the invention may be more clearly understood and readily carried into effect, it will now be described in detail with reference to the accompanying drawing, in which.

Figure 1:
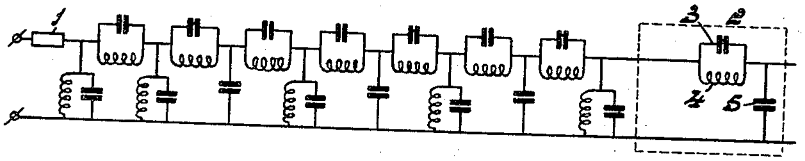
Fig. 1 shows a known basic ladder network.
Figure 2:
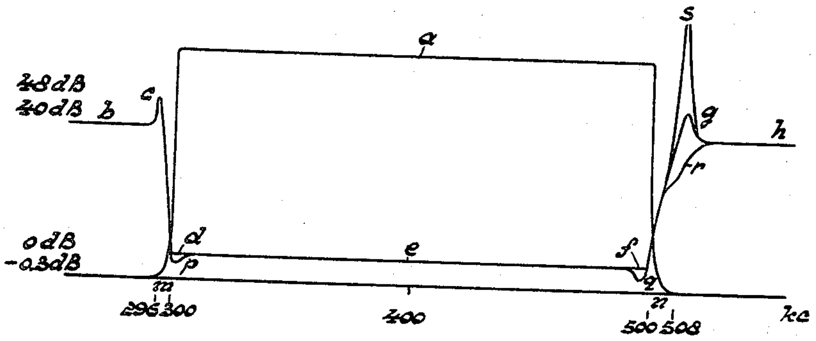
Fig. 2 shows the characteristic transmission and attenuation curves of this basic network and of the network corresponding thereto after all the zero points have been increased by the same real value or damping factor $-H_0$.
Figure 3:
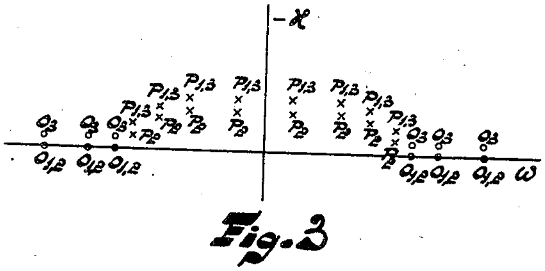
Fig. 3 shows the poles and the zero points of the transmission function of the network.

Referring now to the drawing, Fig. 1 shows a ladder network having a large number of sections and a straight transmission characteristic curve which drops abruptly toward zero outside the transmission band of the network. This may be, for example, a band-pass filter network with a band-pass characteristic as represented by curve *a* in Fig. 2. The attenuation of this network, i. e. the negative logarithm of the transmission as a function of the frequency, is indicated by curve *b—c—d—e—f—g—h*.

In order to calculate the impedance values of the section impedances of this network according to the method hitherto used, all the losses of these impedances are assumed negligible as compared with those of a final resistance, for example an input resistance 1. In this event, after separating this input resistance, the remaining network, of which the poles P and the zero points 0 are all located on the ω axis, consists of loss-free reactances, the values of which can be determined by any of the known network syntheses. To ensure the desired transmission characteristic curve, these reactances of the network must be constructed so as to be as free from losses as possible. Reactances of this character are, however, expensive, so that a network so constructed would be expensive.

According to the invention, this difficulty is avoided as follows. Instead of using the network obtained which, the input resistance 1 inclusive, exhibits as an example the poles $P_1$ and the zero points $0_1$, the values of the reactances are determined, by the method hitherto used, for a network having the same zero points $0_2$, but all poles $P_2$ of which are shifted by an equal amount $-H_0$ from the ω axis. This network in itself will not exhibit the desired transmission characteristic curve, but by replacing $j\omega$ by $j\omega+H_0$ in all reactance values $j\omega L$ and $$\frac{1}{j\omega C}$$

a network is obtained which apparently need no longer employ loss-free reactances and which, since it corresponds to the zero points $0_3$ and the poles $P_3$, has substantially the desired transmission characteristic curve. This is achieved by coupling resistance elements having a value $H_0L$ or $H_0C$ in series with each calculated inductance L or in parallel with each calculated capacity C, respectively. These resistance values may be the natural loss resistances of the reactance elements.

It has been found that this transmission characteristic curve exhibits irregularities only in the neighbourhood of the limiting or cut-off frequencies *m* and *n*, i. e. within the transmission band the network is found to have too low attenuation in this neighbourhood as compared with the further range so that an attenuation characteristic similar to the curve *b—c—p—e—q—g—h* is obtained.

If it should be endeavoured to obviate this too low attenuation by additional damping of a circuit of the network having a resonance frequency in the neighbourhood of, say, the upper cut off frequency *n*, a characteristic curve is obtained corresponding to curve *b—c—p—e—f—r—h*. The attenuation outside the transmission band decreases, as can be seen from part *r* of the characteristic curves.

Particularly at the higher cut-off frequency *n* this may be objectionable. As appears from the frequency values shown by way of example, the frequency difference required in order to obtain a prescribed attenuation is usually smaller at the lower cut-off frequency *m* than at the higher cut-off frequency *n*. Particularly on the side of the higher cut-off frequency special precautions must be taken to obviate undue irregularities without causing the peak *g* in the attenuation characteristic curve to disappear.

This is achieved by replacing the section of the network associated with the zero point nearest the cut-off frequency *n*, by a section which does not pass the frequencies associated with this zero point, care being taken that both the input and the output impedances of the section concerned are not varied, in order that the further characteristic curve of the network is not affected. These input and output impedances have fixed values, since the reactances are determined in accordance with the foregoing. The characteristic curve of the network at the cut-off frequency *n* then becomes *e—f—s—h*.

Figure 4:
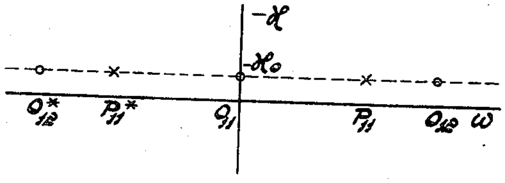
Fig. 4 shows the poles and the zero points of an input admittance of the final section of the network in the complex λ-plane.

The invention will be explained particularly for the case in which the final section 2 of the network of Fig. 1 is chosen as the section to be replaced. As stated above, the reactances 3, 4 and 5 of this section, which are not free from losses, have fixed values, since their purely reactive component has been found as the result of a known method of calculation of the network with zero points $0_2$ and poles $P_2$. The loss resistances of these reactance elements, which in the case of inductance, may be a series resistance and, in the case of capacitors, a parallel resistance, has been found to be $H_0$ times these inductance and capacity values respectively. Thus, the input impedance of this section is known. Its converse, the input admittance which is therefore also known, may be:

$$Y=A\frac{(\lambda+H_0)(\lambda^2+2H_0\lambda+b^2+H_0^2)}{\lambda^2+2H_0\lambda+a^2+H_0^2}$$

where A, $H_0$, *a* and *b* are constants determined by the calculation indicated above. This admittance exhibits poles P and zero points 0, as shown in the complex λ-plane of Fig. 4, where H represents the real (damping) and ω represents the imaginary (frequency) components of λ. Section 2 produces a zero point in the transmission characteristic curve of the network, since the circuit 3—4, corresponding to the additional complex points $0_{12}$ and $0'_{12}$ constitutes, at its resonance frequency, a high impedance relative to capacitor 5. The ladder network is here broken off up to the said sections such that, of all the network zero points, the zero point concerned approaches most closely the transmission passage band of the network.

Figures 5, 6:
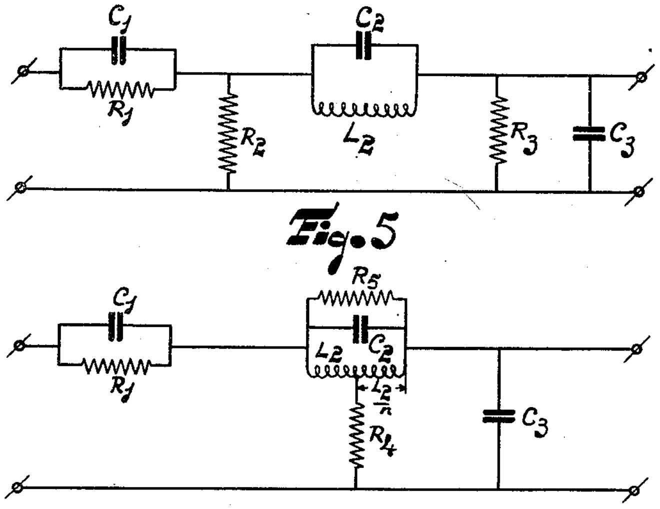
Fig. 5 is a diagram of this final section modified according to the invention.
Fig. 6 shows another embodiment of this final section according to the invention.

This section is now replaced by such a section that frequencies in the proximity of the zero point $0_{12}$ are no longer allowed to pass, the reactance- and resistance values of the section formerly found varying, but the input admittance Y remaining unchanged. This is achieved as follows. First of all a capacitor $C_1$ with loss resistance $R_1$ in the series branch is followed by a resistance $R_2$ in the parallel branch as shown in Fig. 5. The values of the elements are given by the equations:

$$C_1=\frac{2b^2A}{3a^2-b^2};\ R_1=\frac{1}{H_0C_1};\ R_2=\frac{C_1-A}{3H_0AC_1}$$

The admittance of the remaining portion of the section, if $H_0$ is assumed to be small, assumes the form:

$$\frac{AC_1\lambda(\lambda^2+n^2)}{(C_1-A)(\lambda^2+H_0\lambda+\frac{1}{3}b^2+H_0^2)}$$

where $n^2=b^2-3H_0^2$ corresponds to the zero points $0_{12}$, $0'_{12}$ of the admittance of the section. This remaining admittance may furthermore be reduced, in regard to frequencies of the transmission band of the network, to a parallel resonance circuit $L_2C_2$ in the series branch and a capacitor $C_3$ with loss resistance $R_3$ in the parallel branch of the network, the values of which are:

$$C_2=\frac{3AC_1}{C_1-A}\ \frac{b^2-3H_0^2}{2b^2-12H_0^2};\ L_2=\frac{1}{C_2(b^2-3H_0^2)}$$

$$C_3=\frac{3AC_1}{C_1-A}\ \frac{b^2-3H_0^2}{b^2+3H_0^2};\ R_3=\frac{1}{3H_0C_3}\ \frac{b^2-6H_0^2}{b^2-3H_0^2}$$

Instead of a network of which all reactances are required to have very low losses, a network is thus obtained in which only the circuit $L_2C_2$ must have very low losses. This network still yields the favourable attenuation characteristic curve *b—c—d—e—f—g—h*. However, this requirement concerning the circuit $L_2C_2$ may furthermore be avoided by applying a Norton transformation to the section part $R_2$—$C_2$—$L_2$—$R_3$ of the network.

In this event the resistances $R_2$ and $R_3$ are wholly or partly replaced by resistance $R_4$ connecting a tapping $n:1$ of the inductance $L_2$ to the return conductor of the series branch of the quadripole network, and a resistance $R_5$ is coupled in parallel with the parallel resonance circuit $L_2C_2$.

Fig. 6 shows the circuit-arrangement then obtained if the resistances $R_2$ and $R_3$ are transformed in their entirety.

The values of $C_1$, $R_1$, $C_2$, $L_2$ and $C_3$ remaining equal, $R_4$, $R_5$ and $n$ are now found to have the values:

$$R_4=\frac{R_2}{n};\ R_5=\frac{n}{n-1}R_2;$$

$$n=\frac{R_2}{R_3}+1=\frac{3(b^2-3H_0^2)^2}{(b^2+3H_0^2)(b^2-6H_0^2)}+1$$

While I have described my invention in a specific use thereof and in specific embodiments, I do not wish to be limited thereto, for obvious modifications will occur to those skilled in the art without departing from the spirit and scope of the invention.

What I claim is:

1. A ladder network having a transmission characteristic function whose poles and zeros correspond to a characteristic curve which is substantially rectilinear for frequencies falling within a selected frequency band and which abruptly drops toward zero for frequencies falling outside of said band, said network comprising a plurality of sections each of which is provided with reactance elements and inherent loss resistances, said reactances and resistances having values at which the frequencies determined by the poles of the characteristic function of said ladder network are equal to the frequencies determined by the poles of an idealized network having a like plurality of sections provided with loss-free reactance elements and having a transmission characteristic curve substantially equal to that of said ladder network, said resistances having values at which the frequencies determined by the zeros of the characteristic curve of said ladder network differ by a constant imaginary amount from the frequencies determined by the zeros of said idealized network, one section of the non-ideal ladder network having a zero which determines that frequency which falls outside of and is most adjacent to said band including reactance elements preventing transmission of said outside frequency.

2. A ladder network as set forth in claim 1 wherein said one section whose zero determines said outside frequency is a terminal section of said non-ideal network.

3. A ladder network as set forth in claim 1 wherein said one section is a terminal section of the non-ideal network and has an impedance value equal to that of the corresponding section of the ideal network.

4. A network, as set forth in claim 1, wherein said one section is a terminal section and includes a pair of input and a pair of output terminals, one input and one output terminal being interconnected, a resistance-capacitance parallel circuit and a resistance-inductance parallel circuit serially connected between the other input and output terminals, a resistance-capacitance parallel circuit connected across said output terminals, and a resistor connected between the junction of the serially connected parallel circuits and the interconnection of said other input and output terminals.

5. A network, as set forth in claim 1, wherein said one section is a terminal section including a pair of input and a pair of output terminals, one input terminal and one output terminal being interconnected, a resistance-capacitance parallel circuit and resistance-capacitance-inductance parallel circuit connected serially between the other input and output terminals, a capacitor connected across said output terminals, and a resistor connected between a point in said inductance and the other interconnected terminals.

JACOB FREDRIK KLINKHAMER.

References Cited in the file of this patent

UNITED STATES PATENTS

| Number | Name | Date |
|---|---|---|
| 1,850,146 | Zobel | Mar. 22, 1932 |
| 2,093,665 | Tellegen | Sept. 21, 1937 |
| 2,342,638 | Bode | Feb. 29, 1944 |